United States Patent
DeFrancesco et al.

(10) Patent No.: US 11,014,677 B2
(45) Date of Patent: May 25, 2021

(54) REVERSE BOOTSTRAP AIR CYCLE MACHINE

(71) Applicant: Hamilton Sundstrand Corporation, Charlotte, NC (US)

(72) Inventors: Gregory L. DeFrancesco, Simsbury, CT (US); Tony Ho, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 70 days.

(21) Appl. No.: 16/401,909

(22) Filed: May 2, 2019

(65) Prior Publication Data

US 2020/0346763 A1 Nov. 5, 2020

(51) Int. Cl.
 *B64D 13/08* (2006.01)
 *B64D 13/02* (2006.01)
 *F25B 9/00* (2006.01)

(52) U.S. Cl.
 CPC .......... *B64D 13/08* (2013.01); *B64D 13/02* (2013.01); *F25B 9/004* (2013.01)

(58) Field of Classification Search
 CPC ...... B64D 13/08; B64D 13/06; B64D 41/007; B64D 2013/0648; B64D 13/02; F25B 9/004
 See application file for complete search history.

(56) References Cited

U.S. PATENT DOCUMENTS

| | | | |
|---|---|---|---|
| 4,966,005 A | 10/1990 | Cowell et al. | |
| 5,461,882 A | 10/1995 | Zywiak | |
| 6,041,615 A * | 3/2000 | Ostersetzer | B64D 13/06 62/402 |
| 6,127,758 A | 10/2000 | Murry et al. | |
| 8,042,354 B1 | 10/2011 | Dziorny et al. | |
| 9,669,936 B1 | 6/2017 | Fiterman et al. | |
| 2003/0051500 A1 * | 3/2003 | Asfia | B64D 13/06 62/402 |
| 2017/0233083 A1 | 8/2017 | Behrens et al. | |
| 2018/0057174 A1 | 3/2018 | Klimpel et al. | |

FOREIGN PATENT DOCUMENTS

CN 2886450 Y 4/2007

OTHER PUBLICATIONS

Leitner et al., Cooling Airborne Pods by Air Air Cycle Machine, May 2010, (Year: 2010).*
Extended Search Report; Application No. 19209753.3; dated Jun. 10, 2020; 25 pages.
IEEE; "Thermal Management of Military Fighter Aircraft Electro-optics Pod"; Thermal Measurement, Modeling & Management Symposium (Semi-Thermal); IEEE; pp. 341-350; (2003).

* cited by examiner

*Primary Examiner* — Emmanuel E Duke
(74) *Attorney, Agent, or Firm* — Cantor Colburn LLP

(57) ABSTRACT

Disclosed is a cooling circuit for cooling a heat load in an aircraft system, having: a compressor; a turbine connected to the compressor by a shaft, the turbine configured to drive the compressor via the shaft when RAM air pressure into a turbine inlet is above a first threshold; and a motor connected to the shaft configured to drive the compressor when RAM air pressure at the turbine inlet is below the first threshold to cause the compressor to draw air into the turbine inlet, through the turbine, a heat exchanger in fluid communication with the heat load, the compressor, and out of a compressor outlet.

11 Claims, 7 Drawing Sheets

REVERSE BOOTSTRAP AIR CYCLE MACHINE

BACKGROUND

Exemplary embodiments pertain to air cycle machines and more specifically to a reverse bootstrap air cycle machine (ACM) in a pod supported by an aircraft for cooling electrical or electronic equipment in the pod.

A bootstrap air cycle machine (ACM) on an aircraft may include a turbine and compressor mounted on the same shaft. Air driving the compressor may be supplied from the engine (engine bleed air) and may be cooled by passing through a heat exchanger in the bootstrap ACM which may use ambient air to remove the heat from the bleed air. The cooled air may then enter the compressor, where it is pressurized to a higher level. The higher pressure air may then be cooled as it passes through a second heat exchanger which may also utilize ambient air to remove the heat of compression. The cooled high pressure air may then enter the turbine, where it may expand while performing work that powers the compressor rotor. As air expands and performs work, a temperature of the air may be reduced and cooled air may be used for cooling purposes such as cooling equipment or habitable spaces such as the cabin.

In a so called reverse bootstrap ACM, however, RAM air may be first expanded to a sub-ambient pressure and cooled in the turbine and directed to a heat exchanger before being compressed back up to ambient pressure and expelled. The heat exchanger in this configuration is used to remove heat from another source, resulting in heating (rather than cooling) air flowing through the reverse bootstrap ACM.

BRIEF DESCRIPTION

Disclosed is a cooling circuit for cooling a heat load in an aircraft system, comprising: a compressor; a turbine connected to the compressor by a shaft, the turbine configured to drive the compressor via the shaft when RAM air pressure into a turbine inlet is above a first threshold; and a motor connected to the shaft configured to drive the compressor when RAM air pressure at the turbine inlet is below the first threshold to cause the compressor to draw air into the turbine inlet, through the turbine, a heat exchanger in fluid communication with the heat load, the compressor, and out of a compressor outlet.

In addition to one or more of the above disclosed elements or as an alternate, when RAM air pressure at the turbine inlet is above the first threshold, the motor is deactivated, and air is directed to the turbine, to thereby drive the turbine to drive the compressor via the shaft.

In addition to one or more of the above disclosed elements or as an alternate the circuit includes a turbine bypass valve; and a compressor bypass valve; wherein when RAM air pressure at the turbine inlet is above a second threshold that is greater than the first threshold, the turbine bypass valve directs air to bypass the turbine and the compressor bypass valve directs air to bypass the compressor.

In addition to one or more of the above disclosed elements or as an alternate the circuit includes a RAM air pressure sensor at an inlet for the cooling circuit that is fluidly connected to the turbine inlet.

In addition to one or more of the above disclosed elements or as an alternate the circuit includes an electronic controller communicating with the RAM air pressure sensor and operationally controlling the motor, the turbine bypass valve and the compressor bypass valve responsive to sensed RAM air pressure.

In addition to one or more of the above disclosed elements or as an alternate the circuit includes a temperature sensor that senses a temperature of the heat load; wherein the electronic controller communicates with the temperature sensor to determine whether to drive the motor when RAM air pressure is below the first threshold to provide cooling air to fluidly communicate with the heat load.

In addition to one or more of the above disclosed elements or as an alternate the electronic controller communicates with the temperature sensor to determine whether to drive the motor when RAM air pressure is above the first threshold to provide supplemental cooling air to the heat load.

In addition to one or more of the above disclosed elements or as an alternate the heat load comprises electrical circuits or electronics disposed within the reverse bootstrap ACM.

Disclosed is a pod for an aircraft, comprising one or more of the above disclosed features, including: a housing; a first port in the housing forming an air scoop; a second port in the housing forming an air exhaust; a heat load disposed the housing; and a reverse bootstrap ACM disposed in the housing, the reverse bootstrap ACM comprising: a compressor; a turbine connected to the compressor by a shaft, the turbine driving the compressor via the shaft when RAM air pressure at the air scoop is above a first threshold; and a motor connected to the shaft, and when RAM air pressure at the air scoop is below the first threshold, the motor is engaged to drive the compressor via the shaft and cause the compressor to draw air into the air scoop, through the turbine, a heat exchanger fluidly connected to the heat load, the compressor and out the second port.

In addition to one or more of the above disclosed elements or as an alternate when RAM air pressure at the air scoop is above the first threshold, the motor is deactivated, and air is directed to the turbine, to thereby drive the turbine to drive the compressor via the shaft.

In addition to one or more of the above disclosed elements or as an alternate the pod includes a turbine bypass valve and a compressor bypass valve; wherein when RAM air pressure at the air scoop is above a second threshold that is greater than the first threshold, the turbine bypass valve directs air to bypass the turbine and the compressor bypass valve directs air to bypass the compressor.

In addition to one or more of the above disclosed elements or as an alternate the pod includes a RAM air pressure sensor at the inlet scoop.

In addition to one or more of the above disclosed elements or as an alternate the pod is in combination with and mounted to an external surface of an aircraft.

Disclosed is a method of cooling a heat load, the method comprising: obtaining a reverse bootstrap air cycle machine that includes a turbine, a turbine inlet, a compressor, a compressor outlet, a shaft connecting the turbine and the compressor, and a heat exchanger in fluid communication with the heat load; receiving air at the turbine inlet; directing air from the turbine inlet to the turbine; activating a motor when RAM air pressure at the turbine inlet is below a first threshold, wherein the motor drives the shaft to drive the compressor; and drawing air into the turbine inlet.

In addition to one or more of the above disclosed elements or as an alternate the method includes deactivating the motor, when the motor is activated and RAM air pressure at the turbine inlet is greater than the threshold; and driving the shaft with the turbine, when the turbine is driven by air, to drive the compressor.

In addition to one or more of the above disclosed elements or as an alternate the method includes directing air to bypass the turbine and the compressor, when RAM air pressure at the turbine inlet is above a second threshold; and causing the air to flow through the turbine inlet, to fluidly communicate with the heat load and to flow out of the compressor outlet.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
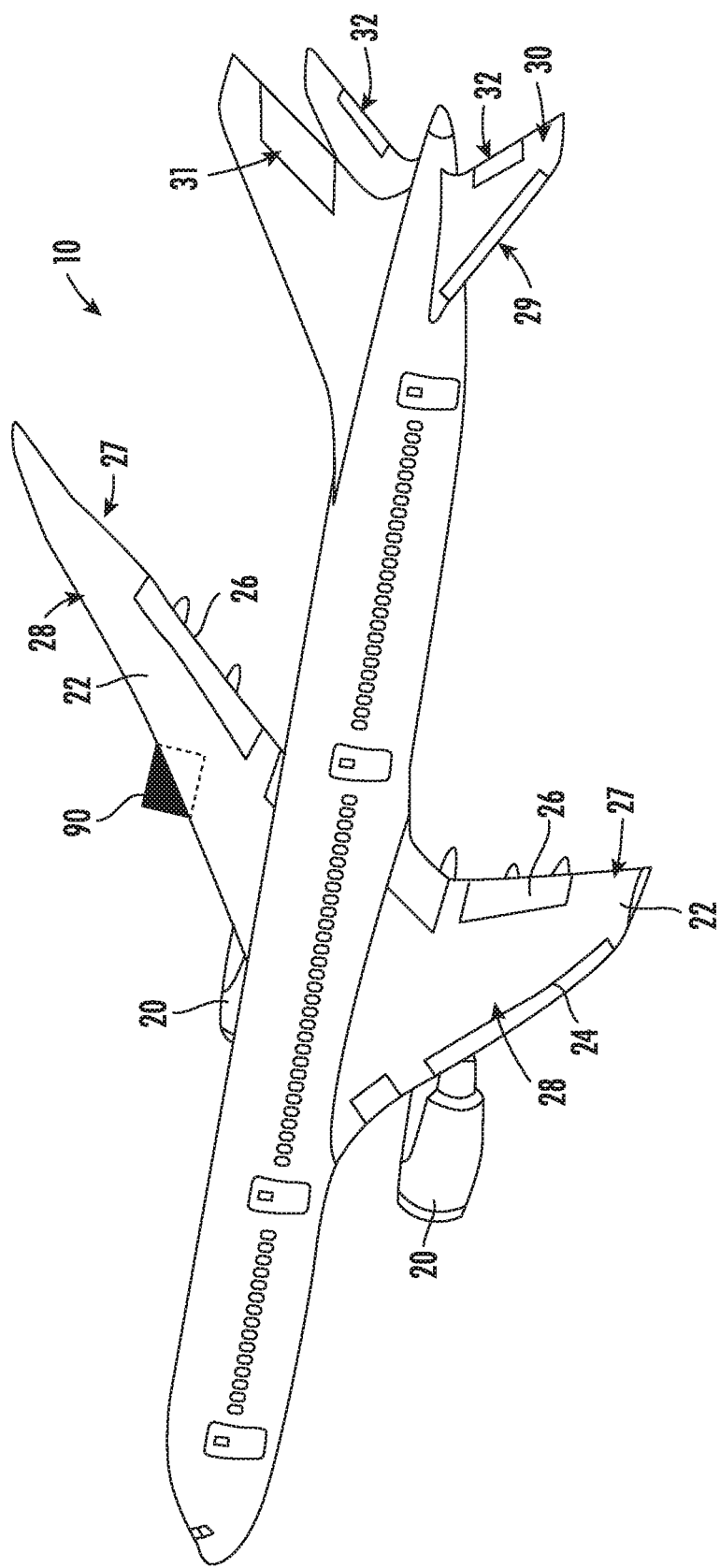
FIG. 1 is a perspective view of an aircraft that includes aerodynamic surfaces where embodiments of the present invention can be implemented.
Figure 2:
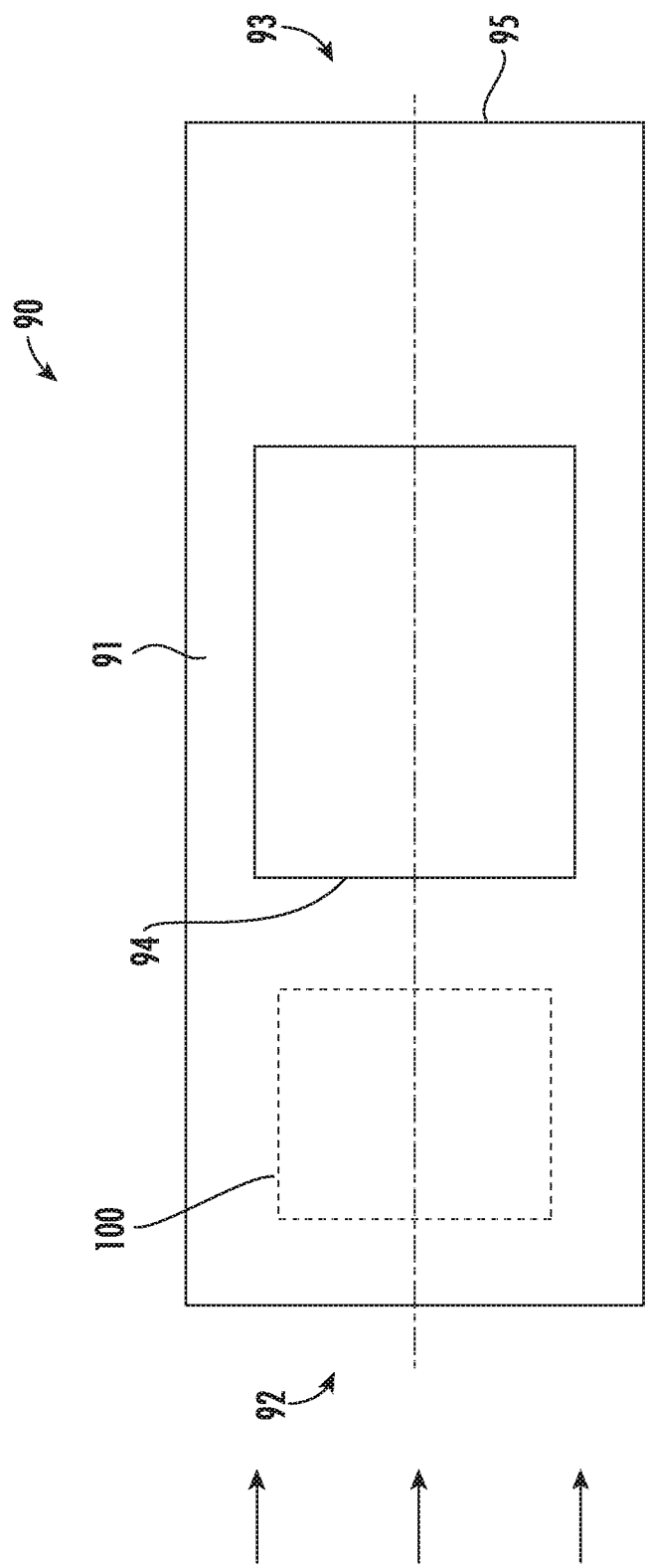
FIG. 2 illustrates a pod for housing a heat load according to a disclosed embodiment.

FIG. 1 illustrates an example of a commercial aircraft 10 having aircraft engines surrounded by (or otherwise carried in) a nacelles 20. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. A pod 90, which is a container, may be attached both structurally and electrically under one of the wings 22. While the container is identified herein as the pod 90, the scope of the disclosure is not limited to only a container and can be implemented outside of a discrete container, for example, in a wing of an aircraft Turning to FIG. 2, the pod 90 includes a housing 91 with an upstream end 92 and a downstream end 93. A first port 94 located mid-span of the upstream end 92 and the downstream end 93 may form an air scoop. A second port 95 located at the downstream end 92 may form an air outlet, for example, an exhaust.

A heat load 100 may be disposed in the pod 90. In one embodiment, the heat load 100 may include a device 102 such as a powered electrical or electronic circuits, including sensors or other equipment for use during flight. The heat load 100 may require active cooling when in use. In one embodiment, the heat load 100 may also include a heat exchanger 104 that is fluidly coupled to the device 102 for cooling the device 102. Disclosed herein is a cooling circuit 105 (FIG. 3) that can be included in the pod 90 or in another location, including other locations in an aircraft.

Figure 3:
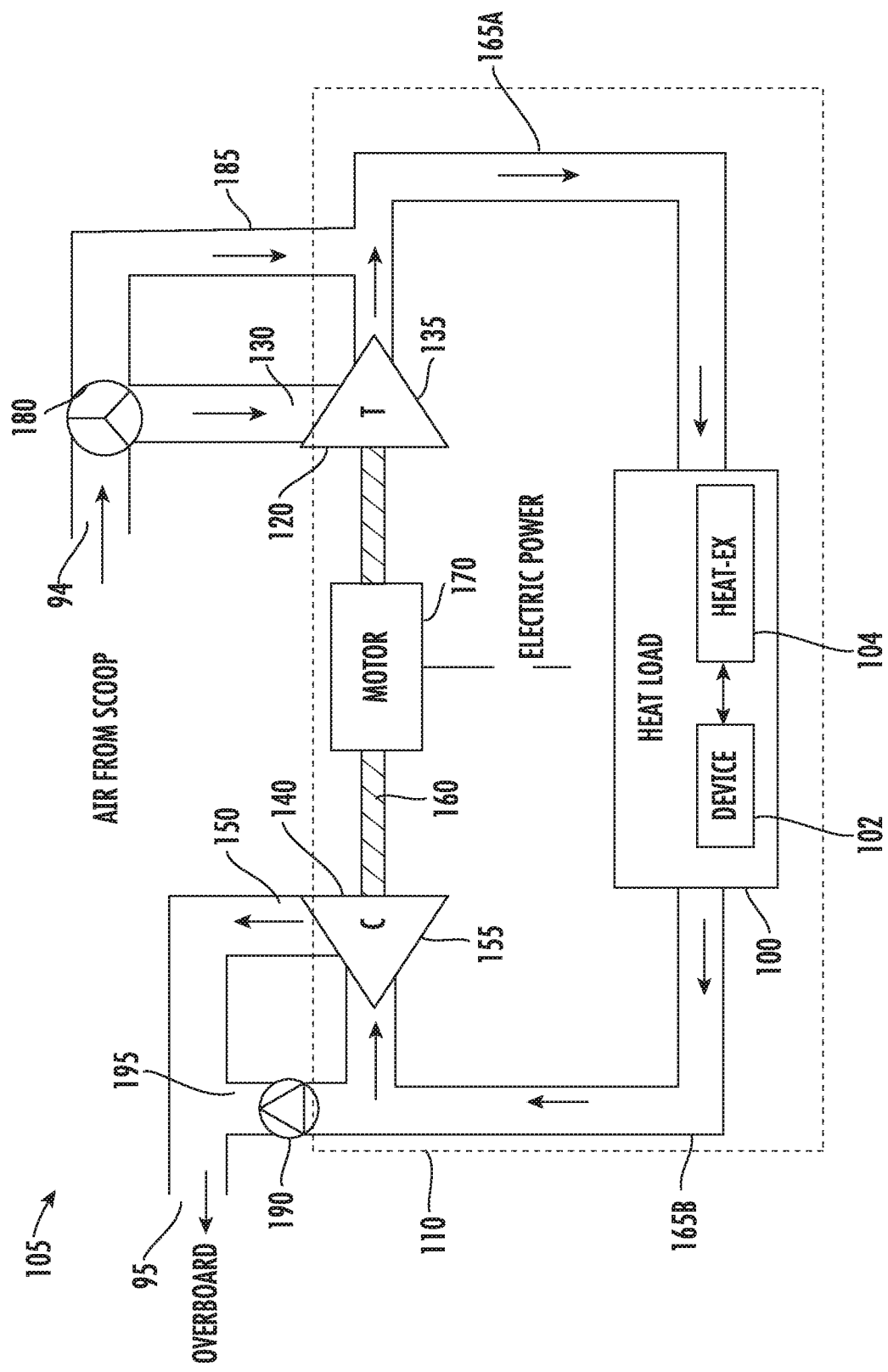
FIG. 3 illustrates a cooling circuit according to a disclosed embodiment.

Turning to FIG. 3, the cooling circuit 105 may be disposed in the pod 90 for purposes of providing cooling air to cool the heat load 100. The cooling circuit 105 may be composed of a reverse bootstrap air cycle machine (ACM) 110 (also called a depressed ambient ACM) that includes a turbine 120, and a compressor 140 connected to the turbine 120 by a shaft 160. The first port 94 functions as a cooling circuit inlet and the turbine 120 includes a turbine inlet 130 which may function as an ACM inlet, fluidly connected to the first port 94. The turbine also includes a turbine outlet 135. The compressor 140 may be provided with a compressor outlet 150, which may also function as an ACM outlet, fluidly connected to the second port 95 in the pod 90, as well as a compressor inlet 155. The shaft 160 connects the turbine 120 and the compressor 140.

The heat load 100 may be in fluid communication with the reverse bootstrap ACM 100, between the turbine 135 and the compressor 155. In one embodiment the device 102 is fluidly disposed between the turbine 135 and the compressor 155 so that air from the turbine flows over the device 102 in the pod 90 as the air is drawn to the compressor 155. In one embodiment, the heat exchanger 104 is ducted between the turbine 135 and the compressor 155, and the heat exchanger 104 is in fluid communication with the device 102 to remove heat from the device 102. Ducting generally referred to as 165 may be included in the reverse bootstrap ACM 110. The ducting 165 may include first ducting 165A between the turbine 135 and the heat exchanger 104 and second ducting 165B between the heat exchanger 104 and the compressor 140.

When the aircraft 10 is in flight, RAM air flow enters from the air scoop 94 and the flow is ducted between the turbine inlet 130, which may be a turbine feed duct, and the turbine 120. In one embodiment a turbine bypass valve 180 may be connected to both the turbine inlet 130 and a turbine bypass duct 185 to provide a parallel flow between the reverse bootstrap ACM 110 and the air scoop 94. The turbine bypass duct 185 connects to the first ducting 165A downstream of the turbine 120 and the turbine inlet 130. A compressor bypass valve 190 may be connected in a compressor bypass duct 195 that is fluidly connected to the second ducting 165B. The compressor bypass duct 195 may be connected in parallel with the compressor outlet 150, which may be a compressor outlet duct, to the air exhaust 95. With this configuration, the compressor bypass duct 195 connects to the reverse bootstrap ACM 110 upstream of the compressor 140 to the compressor outlet 150.

The RAM air pressure is higher than ambient air pressure while the aircraft 10 is in flight. Air expands as it passes through the turbine 120, performing work and thereby giving up heat, and air leaves the turbine 120 via the outlet at a lower temperature than it entered the turbine 120. This causes rotation of the turbine 120 and, thus, rotation of shaft 160. This rotation will in turn, cause the compressor 140 to create a pressure differential between its inlet 155 and outlet 150.

In an embodiment with the heat exchanger 104, the heat exchanger 104 is downstream of the turbine 120. The cooler turbine exhaust air from the turbine 120 passes through the heat exchanger 104, cooling the medium flowing within the heat exchanger 104. After passing through the heat exchanger 104, the air is drawn into the compressor 140 due to the pressure differential described above. Air leaves the compressor 140 via the compressor outlet 150 and is exhausted out of the pod outlet 95. In one embodiment, as indicated, the heat load 100 is a device 102 disposed in the pod 90, and cooling air flow may flow directly over the device 102 between the turbine 120 and the compressor 140.

In normal operation while being transported via an aircraft in flight, air exits the turbine 120 to a pressure which is below ambient pressure. The compressor 140, powered by the turbine 120 through the shaft 160, lowers pressure to create this vacuum downstream of the turbine 120 thus producing the temperature depression required to accomplish the cooling of the heat load 100.

When the aircraft 10 Mach Number and therefore RAM pressure is below the design values for the reverse bootstrap ACM 110, most notably when the aircraft 10 is on the ground and RAM air pressure is equivalent to ambient pressure, sufficient power is unavailable to drive the turbine. Thus, the shaft 160 may not be driven by the turbine 120, e.g., alone, and the compressor 140 may not be driven by the shaft 120. Adequate vacuum may not be created in the reverse bootstrap ACM 110 so that a desired cooling of the heat load 100 may not be realized.

For driving the shaft 160 when the aircraft 10 is on the ground, or otherwise when RAM air pressure is below a first threshold and cooling air is needed, a motor 170 may be connected to the shaft 160. The reverse bootstrap cycle requires sufficient pressure differential between ambient and turbine inlet to drive the cycle. Power generated in the turbine further "bootstraps" the cycle below ambient by driving the compressor. If the pressure differential results in insufficient cooling compared to what is demanded by the cycle, the motor connected to the shaft will become activated to drive the ACM to meet the cooling demand. As discussed more fully below, the motor 170 can be controlled based on a pressure of air in the first port 94.

Figure 4:
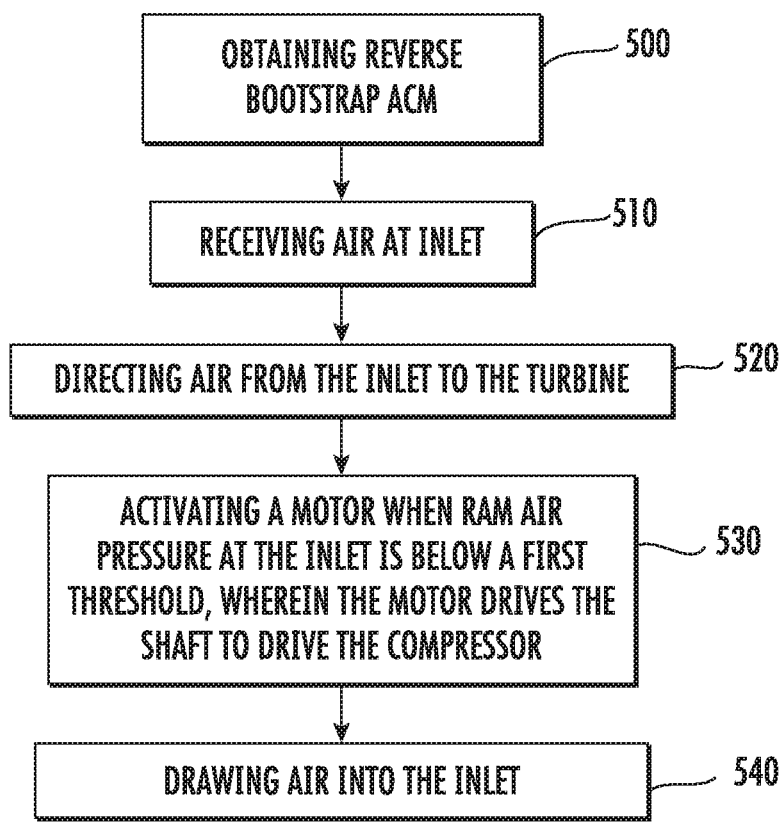
FIG. 4 illustrates a process of cooling a heat load with a cooling circuit according to a disclosed embodiment when RAM air pressure is below a first threshold.

Turning to FIG. 4, a method is disclosed of cooling the heat load 100 with the cooling circuit 105. As shown in Block 500 the method includes providing the cooling circuit 105 with the reverse bootstrap air cycle machine (ACM) 110 that includes the turbine 120, the turbine inlet 130, the compressor 140, the compressor outlet 150, and the shaft 160 connecting the turbine 120 and the compressor 140. The heat load 100 may be in fluid communication with the reverse bootstrap ACM 100, between the turbine 135 and the compressor 155.

As shown in Block 510 the method includes receiving air at the turbine inlet 130. As shown in Block 520 the method includes directing air from the turbine inlet 130 to the turbine 120. As shown in Block 530 the method includes activating the motor 170 when pressure upstream of the turbine inlet 130, that is, at the scoop 94, is below the first threshold. The motor 170, when activated, drives the shaft 160 to drive the compressor 140. As shown in Block 540 the method includes drawing air into the turbine inlet 130. Air is drawn in by the compressor 140 when driven by the shaft 160, through the turbine 120, the heat exchanger 104, the compressor 140, and out of the compressor outlet 150.

Figure 5:
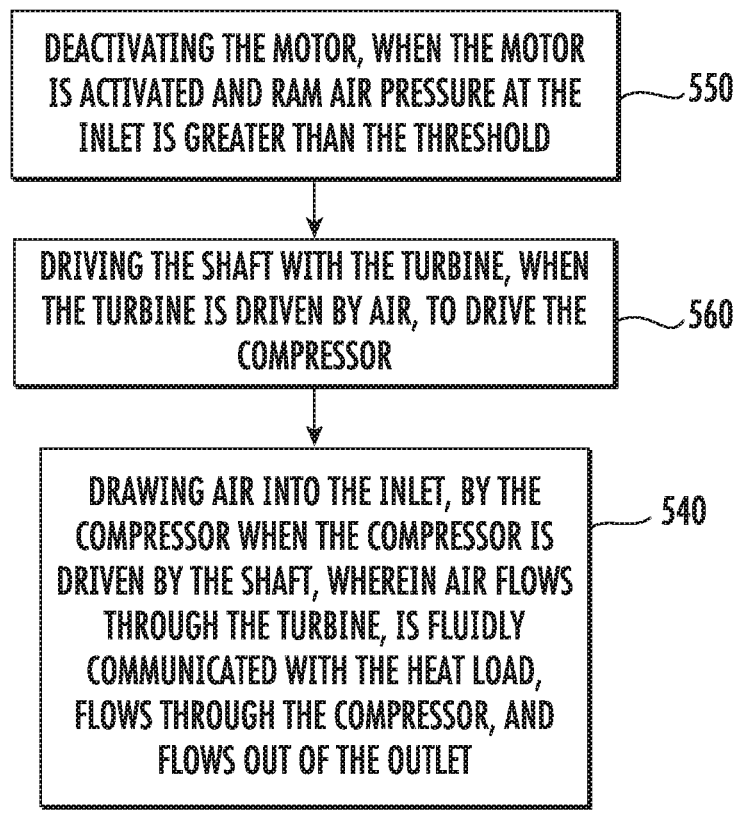
FIG. 5 illustrates a process of cooling a heat load with a cooling circuit according to a disclosed embodiment when RAM air pressure is above a first threshold.

Turning to FIG. 5, in one embodiment, as shown in Block 550, the method includes deactivating the motor 170, when the motor 170 is activated and upstream of the turbine inlet 130, that is, at the scoop 94, is or becomes greater than the first threshold. As shown in Block 560 the method includes driving the shaft 160 with the turbine 120, when the turbine 120 is driven by air. As shown. Block 560 is followed by Block 540, introduced above, of drawing air into the turbine inlet 130 by the compressor 140 when driven by the shaft 160, through the turbine 120, the heat exchanger 160, the compressor 140, and out of the compressor outlet 150.

When RAM air pressure at the turbine inlet 130 is above a second threshold that is greater than the first threshold or the turbine inlet 130 temperature is significantly lower than at the design ambient conditions such that the cycle produce more cooling than the heat load demand, the turbine bypass valve 180 may direct air to bypass the turbine 120 and the compressor bypass valve 190 may direct air to bypass the compressor 140. Under conditions of sufficiently high RAM air pressure, for example when cruising at sufficiently high speeds, cooling air may flow to the heat exchanger 104 in the reverse bootstrap ACM 110 without running the compressor 140 and turbine 120.

Figure 6:
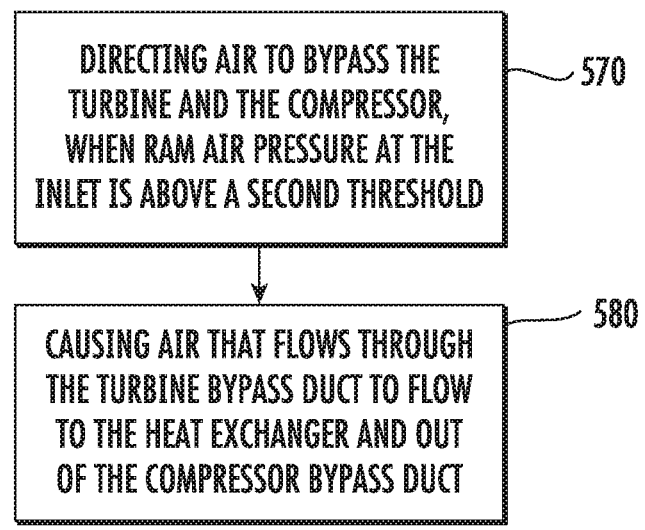
FIG. 6 illustrates a process of cooling a heat load with a cooling circuit according to a disclosed embodiment when RAM air pressure is above a second threshold.

Turning to FIG. 6, as shown in Block 570 the method of modulating cooling the heat load 100 includes directing air to bypass the turbine 120 and the compressor 140 when temperature at the turbine outlet 135 is below a minimum value. As shown in Block 580 this configuration causes air to flow through the turbine bypass duct 185 into the reverse bootstrap ACM 110, through the heat exchanger 104 and out of the compressor bypass duct 195. This reduces the cooling capacity of the cycle and allows the required cooling demand to be met without overcooling.

Figure 7:
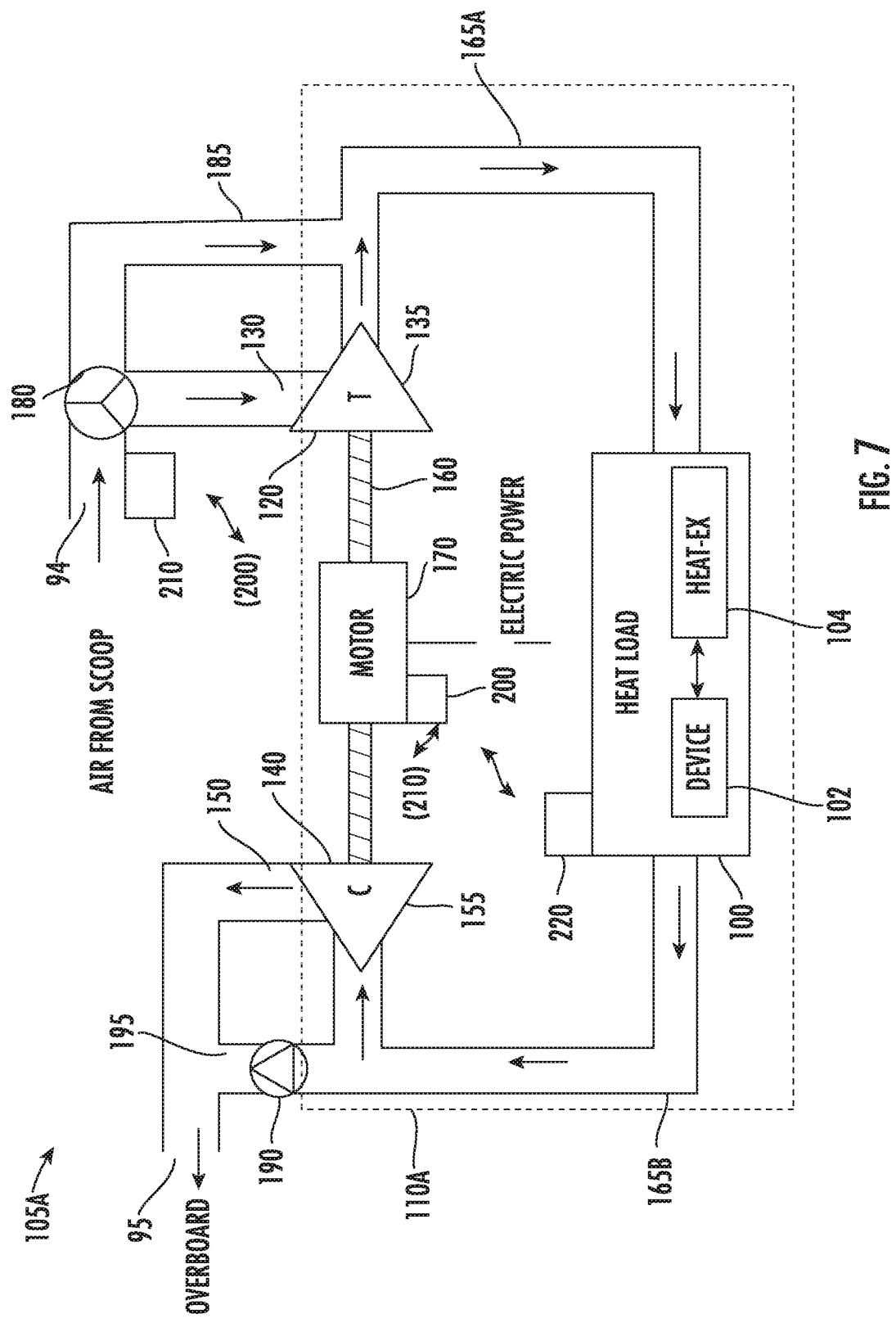
FIG. 7 illustrates a cooling circuit according to a disclosed embodiment, the circuit including a controller, a pressure sensor and a temperature sensor.

Turning to FIG. 7, an embodiment of the cooling circuit 105A is disclosed which may be disposed in the pod 90 for purposes of providing cooling air to cool the heat load 100. As with the cooling circuit 105 in FIG. 3, the cooling circuit 105A may composed of a reverse bootstrap air cycle machine (ACM) 110A. As with the reverse bootstrap ACM 110 illustrated in FIG. 3, the reverse bootstrap ACM 110A includes the turbine 120, and the compressor 140 connected to the turbine 120 by the shaft 160. The first port 94 functions as a cooling circuit inlet and the turbine 120 includes a turbine inlet 130 which may function as an ACM inlet, fluidly connected to the first port 94. The turbine also includes the turbine outlet 135. The compressor 140 may be provided with the compressor outlet 150, which may also function as an ACM outlet, fluidly connected to the second port 95 in the pod 90, as well as the compressor inlet 155. The shaft 160 connects the turbine 120 and the compressor 140.

The heat load 100 may be in fluid communication with the reverse bootstrap ACM 100, between the turbine 135 and the compressor 155. In one embodiment the device 102 is fluidly disposed between the turbine 135 and the compressor 155 so that air from the turbine flows over the device 102 in the pod 90 as the air is drawn to the compressor 155. In one embodiment, the heat exchanger 104 is ducted between the turbine 135 and the compressor 155, and the heat exchanger 104 is in fluid communication with the device 102 to remove heat from the device 102.

Ducting generally referred to as 165 may be included in the reverse bootstrap ACM 110. The ducting 165 may include first ducting 165A between the turbine 135 and the heat exchanger 104 and second ducting 165B between the heat exchanger 104 and the compressor 140. When the aircraft 10 is in flight, RAM air flow enters from the air scoop 94 and the flow is ducted between the turbine inlet 130, which may be a turbine feed duct, and the turbine 120. In one embodiment a turbine bypass valve 180 may be connected to both the turbine inlet 130 and a turbine bypass duct 185 to provide a parallel flow between the reverse bootstrap ACM 110 and the air scoop 94. The turbine bypass duct 185 connects to the first ducting 165A downstream of the turbine 120 and the turbine inlet 130. A compressor bypass valve 190 may be connected in a compressor bypass duct 195 that is fluidly connected to the second ducting 165B. The compressor bypass duct 195 may be connected in parallel with the compressor outlet 150, which may be a compressor outlet duct, to the air exhaust 95. With this configuration, the compressor bypass duct 195 connects to the reverse bootstrap ACM 110 upstream of the compressor 140 and the compressor outlet 150.

An electronic controller 200 may be provided in the cooling circuit 105A, within the reverse bootstrap ACM 110A. The controller 200 may be operationally connected to the motor 170 and may communicate with a RAM air pressure sensor 210 operationally connected to the air scoop 94. The electronic controller 200 may control the motor 170, the turbine bypass valve 180 and the compressor bypass valve 190 responsive to sensed RAM air pressure. The electronic controller 200 may communicate with a temperature sensor 220 operationally connected to the heat load 100 for sensing a temperature of the heat load 100. The electronic controller 200 may communicate with the temperature sensor 220 to determine whether to drive the motor 170 when RAM air pressure at the turbine inlet 130 is above the first threshold to provide supplemental cooling to the heat load 100. In such instance, supplemental cooling may be provided, for example, while the aircraft 10 is in flight on a relatively warm day or when air conditions in flight result in low RAM air pressure at the turbine inlet 130.

With the above disclosed reverse bootstrap air cycle machine (ACM) 110, RAM air at elevated pressure may enter the turbine 120 where air is expanded to a pressure below ambient pressure. Vacuum pressure is achieved through the compressor 140 which discharges air overboard, back to the ambient environment, after the heat load 100 is absorbed. In the above disclosed reverse bootstrap ACM 110, the electric motor 170 is added to enhance the turbine pressure ratio and provide cooling at ground static conditions at which RAM pressure is not present. The addition of the motor 170 to the reverse bootstrap ACM 110 enhances performance and increases a cycle effectiveness over an operating envelope of the reverse bootstrap ACM 110 including static conditions, such as on a ground. A benefit of this electrically powered air cycle relative to a vapor cycle is in regard to complexity, for example, fewer heat exchangers, not needing a separate fan for ground cooling, no need to maintain refrigerant charge.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooling circuit for cooling a heat load in an aircraft system, comprising:
   a compressor;
   a turbine connected to the compressor by a shaft, the turbine configured to drive the compressor via the shaft when RAM air pressure into a turbine inlet is above a first threshold to drive the turbine; and
   a motor connected to the shaft configured to drive the compressor when RAM air pressure at the turbine inlet is below the first threshold to drive the turbine, to cause the compressor to draw air into the turbine inlet, through the turbine, a heat exchanger in fluid communication with the heat load, the compressor, and out of a compressor outlet;
   a RAM air pressure sensor at an inlet for the cooling circuit that is fluidly connected to the turbine inlet;
   an electronic controller communication with the RAM air pressure sensor and operationally controlling the motor, the turbine bypass valve and the compressor bypass valve responsive to sensed RAM air pressure;
   a temperature sensor that senses a temperature of the heat load; and
   wherein the electronic controller communicates with the temperature sensor to determine whether to drive the motor when RAM air pressure is below the first threshold to drive the turbine, to thereby provide cooling air to fluidly communicate with the heat load,
   wherein when RAM air pressure at the turbine inlet is above the first threshold to drive the turbine, the motor is deactivated, and air is directed to the turbine, to thereby drive the turbine to drive the compressor via the shaft.

2. The cooling circuit of claim 1, including:
   a turbine bypass valve; and
   a compressor bypass valve;
   wherein when RAM air pressure at the turbine inlet is above a second threshold that is greater than the first threshold, the turbine bypass valve directs air to bypass the turbine and the compressor bypass valve directs air to bypass the compressor.

3. The cooling circuit of claim 1, wherein:
   the electronic controller communicates with the temperature sensor to determine whether to drive the motor when RAM air pressure is above the first threshold to provide supplemental cooling air to the heat load.

4. The cooling circuit of claim 1, wherein the heat load comprises electrical circuits or electronics disposed within the reverse bootstrap ACM.

5. A pod for an aircraft, comprising:
   a housing;
   a first port in the housing forming an air scoop;
   a second port in the housing forming an air exhaust;
   a heat load disposed the housing; and
   a reverse bootstrap ACM disposed in the housing, the reverse bootstrap ACM comprising:
   a compressor;
   a turbine connected to the compressor by a shaft, the turbine driving the compressor via the shaft when RAM air pressure at the air scoop is above a first threshold to drive the turbine;
   a motor connected to the shaft, and when RAM air pressure at the air scoop is below the first threshold to drive the turbine, the motor is engaged to drive the compressor via the shaft and cause the compressor to draw air into the air scoop, through the turbine, a heat exchanger fluidly connected to the heat load, the compressor and out the second port;

a RAM air pressure sensor at the inlet scoop;

an electronic controller communicating with the RAM air pressure sensor and operationally controlling the motor, the turbine bypass valve and the compressor bypass valve responsive to sensed RAM air pressure;

a temperature sensor that senses a temperature of the heat load; and wherein the electronic controller communicates with the temperature sensor to determine whether to drive the motor when RAM air pressure is below the first threshold to drive the turbine, to thereby provide cooling air to fluidly communicate with the heat load;

wherein when RAM air pressure at the turbine inlet is above the first threshold to drive the turbine, the motor is deactivated, and air is directed to the turbine to thereby drive the turbine to drive the compressor via the shaft.

6. The pod of claim 5, further comprising:

a turbine bypass valve and a compressor bypass valve; and wherein when RAM air pressure at the air scoop is above a second threshold that is greater than the first threshold, the turbine bypass valve directs air to bypass the turbine and the compressor bypass valve directs air to bypass the compressor.

7. The pod of claim 5, wherein:

the electronic controller communicates with the temperature sensor to determine whether to drive the motor when RAM air pressure is above the first threshold to provide supplemental cooling air to fluidly communicate with the heat load.

8. The pod of claim 5, wherein the heat load comprises electrical circuits or electronics disposed within the reverse bootstrap ACM.

9. The pod of claim 8, in combination with and mounted to an external surface of an aircraft.

10. A method of cooling a heat load, the method comprising:

obtaining a reverse bootstrap air cycle machine that includes;

a compressor;

a turbine connected to the compressor by a shaft, the turbine driving the compressor via the shaft when RAM air pressure at the air scoop is above a first threshold to drive the turbine;

a motor connected to the shaft, and when HAM air pressure at the air scoop is below the first threshold to drive the turbine, the motor is engaged to drive the compressor via the shaft and cause the compressor to draw air into the air scoop, through the turbine, a heat exchanger fluidly connected to the heat load, the compressor and out the second port;

a RAM air pressure sensor at the inlet scoop;

an electronic controller communicating with the RAM air pressure sensor and operationally controlling the motor, the turbine bypass valve and the compressor bypass valve responsive to sensed RAM air pressure;

a temperature sensor that senses a temperature of the heat load; and wherein the electronic controller communicates with the temperature sensor to determine whether to drive the motor when RAM air pressure is below the first threshold to drive the turbine, to thereby provide cooling air to fluidly communicate with the heat load;

wherein when RAM air pressure at the turbine inlet is above the first threshold to drive the turbine, the motor is deactivated, and air is directed to the turbine, to thereby drive the turbine to drive the compressor via the shaft;

receiving air at the turbine inlet;

directing air from the turbine inlet to the turbine;

activating the motor when RAM air pressure at the turbine inlet is below the first threshold to drive the turbine, wherein the motor drives the shaft to drive the compressor; and drawing air into the turbine inlet, wherein;

when RAM air pressure at the turbine inlet is above the first threshold to drive the turbine, the motor is deactivated, and air is directed to the turbine, to thereby drive the turbine to drive the compressor via the shaft.

11. The method of claim 10, comprising directing air to bypass the turbine and the compressor, when RAM air pressure at the turbine inlet is above a second threshold that is greater than the first threshold; and causing the air to flow through the turbine inlet, to fluidly communicate with the heat load and to flow out of the compressor outlet.

* * * * *